(12) United States Patent
Wahli

(10) Patent No.: US 10,134,220 B2
(45) Date of Patent: Nov. 20, 2018

(54) METHOD AND SYSTEM FOR AUTHORIZING ACCESS TO GOODS AND/OR SERVICES AT A POINT OF SALE AND CORRESPONDING POINT OF SALE

(71) Applicant: Microtronic AG, Oensingen (CH)

(72) Inventor: Bernard Wahli, Walchwil (CH)

(73) Assignee: MICROTRONIC AG, Oensingen (CH)

( * ) Notice: Subject to any disclaimer, the term of this patent is extended or adjusted under 35 U.S.C. 154(b) by 20 days.

(21) Appl. No.: 15/505,344

(22) PCT Filed: May 7, 2014

(86) PCT No.: PCT/EP2014/059365
§ 371 (c)(1),
(2) Date: Feb. 21, 2017

(87) PCT Pub. No.: WO2015/169356
PCT Pub. Date: Nov. 12, 2015

(65) Prior Publication Data
US 2017/0263072 A1    Sep. 14, 2017

(51) Int. Cl.
| | | |
|---|---|---|
| G06F 7/08 | (2006.01) | |
| G07F 17/00 | (2006.01) | |
| G06Q 20/20 | (2012.01) | |
| G07F 11/62 | (2006.01) | |
| G07F 17/14 | (2006.01) | |
| G07F 7/10 | (2006.01) | |

(52) U.S. Cl.
CPC ....... *G07F 17/0014* (2013.01); *G06Q 20/202* (2013.01); *G07F 7/10* (2013.01); *G07F 11/62* (2013.01); *G07F 17/14* (2013.01)

(58) Field of Classification Search
CPC ........ G07F 17/0014; G07F 17/14; G07F 7/10; G07F 11/62; G06Q 20/202
USPC .................................................. 235/375, 381
See application file for complete search history.

(56) References Cited

U.S. PATENT DOCUMENTS

| | | | | |
|---|---|---|---|---|
| 2001/0039512 | A1* | 11/2001 | Nicholson | G06Q 30/02 705/14.17 |
| 2004/0158493 | A1* | 8/2004 | Nicholson | G06Q 20/387 705/14.25 |
| 2005/0098625 | A1* | 5/2005 | Walker | G06Q 20/209 235/381 |

(Continued)

FOREIGN PATENT DOCUMENTS

WO    WO-2014/063727 A1    5/2014

*Primary Examiner* — Paultep Savusdiphol
(74) *Attorney, Agent, or Firm* — Drinker Biddle & Reath LLP

(57) ABSTRACT

A system and method for authorizing access to goods and/or services at a point of sale is disclosed. An access voucher may be issued and presented to a reading means of the point of sale. At least one good and/or service of the point of sale can be selected by the user and the corresponding identification can be transferred to the internal processing unit. A comparison can be performed. If the transferred identification of the user matches an identification of the user, and if the transferred identification of the goods and/services matches an identification of the goods/and services, the user profile data and the access parameter can be retrieved. An authorization can be transferred to the point of sale if the user profile data correspond to the access parameter for the goods and/or services.

15 Claims, 3 Drawing Sheets

(56) References Cited

U.S. PATENT DOCUMENTS

| | | | |
|---|---|---|---|
| 2009/0259553 A1* | 10/2009 | Carroll | G06Q 20/20 705/15 |
| 2010/0250385 A1* | 9/2010 | Lempel | G06Q 30/02 705/26.1 |
| 2011/0047010 A1* | 2/2011 | Arnold | G06Q 30/02 705/14.1 |
| 2011/0295673 A1* | 12/2011 | VanNoller | G06Q 30/0225 705/14.26 |
| 2015/0278791 A1* | 10/2015 | Wahli | G06Q 20/20 705/17 |

* cited by examiner

METHOD AND SYSTEM FOR AUTHORIZING ACCESS TO GOODS AND/OR SERVICES AT A POINT OF SALE AND CORRESPONDING POINT OF SALE

CROSS REFERENCE TO RELATED APPLICATIONS

This application is a National Stage of International Application No. PCT/EP2014/059365 filed May 7, 2014, which is herein incorporated by reference in its entirety.

TECHNICAL FIELD OF THE INVENTION

The present invention relates to a method and a system for authorising access to goods and/or services at a point of sale, in which the access to goods and/or services is authorised based on an access voucher. In addition, the present invention also relates to a corresponding point of sale.

BACKGROUND ART

Everybody accesses goods and services on a daily basis. By way of example only, each time we take a cup of coffee, we access goods (i.e. a cup filled with coffee) and a service (i.e. the preparation of coffee). Generally, the access to these different goods and/or services needs to be controlled such that only authorised users can effectively access them.

In the last decades, automated points of sale (in particular the so called vending machines) have been used more and more frequently all over the world. These vending machines are generally devices which are able of dispensing different goods or services (e.g. coffee, sandwiches, tobacco products, consumer products of all kinds, newspapers, etc.) in an automated way. To this end, such vending machines generally comprise more or less sophisticated machinery that can store these items and dispense them in an appropriate way when they have been selected by a user.

Generally, in order to obtain access to goods and/or services from such a vending machine, the user is required to insert coins or paper money into them. More sophisticated vending machines accept credit or debit cards, or some kind of tokens issued specially for this purpose. Even more sophisticated machines also allow accessing goods and/or services using an electronic wallet, for example rechargeable chips and/or mobile phones (or other similar devices).

However, all current methods for acquiring goods and/or services at a vending machine have some drawbacks. More specifically, "classic" vending machines require personnel for emptying the repository for banknotes, coins or tokens. In case the vending machine is configured to work also with credit or debit cards, chips, badges or other similar electronic payment means, the vending machine must comprise a reading means for reading the data from these supports and for identifying the user identity and/or his (or her) credit prior to allowing access to the required goods and/or services. However, such an identification process requires a sophisticated processing unit at the vending machine itself and a possibility to access the identification databases in a secure way which makes the vending machines both costly and vulnerable to attacks from non-authorised users. For example, if a user pays goods and/or services using the credit card, the vending machine needs to read out all data required by the credit card issuing company in order to authorise the purchase, including also the security parameters such as PIN codes, passwords, and similar. Thus, if this data is obtained by a non-authorised user, they can be used in a fraudulent way.

DISCLOSURE OF THE INVENTION

It is thus an object of this invention to propose a new and improved method and a new and improved system for authorising access to goods and/or services at a point of sale which do not present the above-mentioned inconveniences and disadvantages of the prior art. Moreover, an object of this invention is also to propose a new and improved corresponding point of sale.

More specifically, an object of this invention is to propose a new and improved method, a new and improved system and a new and improved corresponding point of sale which allow for authorising access to goods and/or services in a way which guarantees both an enhanced security and a lower costs for the points of sale.

According to the present invention, these and other objectives are achieved in particular through the features of the independent claims. In addition, further advantageous embodiments follow from the dependent claims and the description.

More particularly, this object is achieved through the present invention by a method for authorising access to goods and/or services at a point of sale, in which access to goods and/or services is authorised based on an identification of the user, in which an access voucher, comprising at least an identification of the user is issued by a voucher issuing means, the access voucher is presented to a reading means of the point of sale, at least the identification of the user being read and transferred by the reading means to an internal processing unit of the point of sale, at least one good and/or service of the point of sale is selected by the user and the corresponding identification is transferred to the internal processing unit, the identification of the user and the identification of goods and/or services is transferred by the internal processing unit to a centralised processing unit which compares the transferred identification of the user with the at least one stored identification of the user and the transferred identification of the goods and/or services with the at least one stored identification of goods and/or services, and in which, if the transferred identification of the user matches an identification of the user stored in the centralised processing unit and if the transferred identification of the goods and/services matches an identification of the goods/and services stored in the centralised processing unit, the centralised processing unit retrieves user profile data and the access parameter for the goods and/or services, and an authorisation for accessing the selected goods and/or services is transferred to the point of sale by the centralised processing unit if the user profile data correspond to the access parameter for the goods and/or services.

The advantage of the present invention resides primarily in the fact that access to goods and/or services at a point of sale can be authorised only if the identification of the user is verified by a centralised processing unit, together with the information about the selected goods and/or services which is stored exclusively at the centralised processing unit. In other words, the user profile data and the access parameter of the selected goods and/or services need to be matched by the centralised processing unit in order to have the access to these goods and/or services at the point of sale authorised. Thus, the present invention makes it possible to limit the complexity and the costs of the points of sale.

In an embodiment variant, the access voucher comprises optical machine-readable data, in particular a barcode and/or a matrix code. Any kind of known machine-readable data storage means can generally be used; however, use of two-dimensional matrix codes and in particular use of so-called QR ("Quick Response") codes presents important advantages with respect to other possible technologies. Thus, this embodiment variant of the invention has the advantage, among other things, that the reading of the access voucher by the reading means of the point of sale and the transferring of the data comprised in the access voucher to the processing unit of the point of sale can be performed using a simple and well established technology.

In another embodiment variant, the machine-readable data of the access voucher are arranged on a disposable support, in particular on paper. The advantage of this embodiment variant is, among other things, that the access voucher can be, if required, realised as a completely disposable object and intended for one single use. If paper is used, virtually any kind of paper support can be used as the data carrier of the access voucher (e.g. a simple paper slip, such as a purchase receipt which is generally issued after a purchase transaction). Since the application of paper is more or less unlimited, this embodiment variant of the method for authorising access to goods and/or services allows for a very large range of use.

In a further embodiment variant, the data between the point of sale and the centralised processing unit are transmitted over a wired and/or wireless link, in particular over a data communication protocol. In this way, standardised communication protocols can be used, which allows for an even less complex and costly point of sale.

In another embodiment variant, the user profile data comprises the information about the current state of the personal credit account. More specifically, this personal credit account of the user can be managed by the centralised processing unit itself or by a separate entity such as a bank, a credit card institute or any similar authority. Also, this personal credit account of the user can be a general account, used also for other purposed, or a dedicated user credit account, used exclusively for purchasing goods and/or services at the point of sale.

In a further embodiment variant, the access parameters for the goods and/or services comprise the purchase price of the goods and/or services. In this way, the point of sale can be administered in a centralised way, and all price changes can be very quickly implemented on every point of sale.

In still another embodiment variant, the identification of the user and/or the identification of the goods and/or services transmitted to the centralised processing unit are encrypted, and the centralised processing unit comprises a decryption means for decrypting encrypted data. The advantage of this embodiment variant, inter alia, lies in the fact that the data sent by the point of sale cannot be read and interpreted by unauthorised persons. In particular, the encrypting of the data can therefore be used to prevent an unauthorised generation of access vouchers (i.e. the creation of access vouchers that would be interpreted as genuine vouchers by the point of sale, but which have not been issued by an authorised issuing authority).

At this point, it should be stated that, besides the method for authorising access to goods and/or services at a point of sale according to the above-identified embodiments of the invention, the present invention also relates to a corresponding system and a corresponding point of sale.

BRIEF DESCRIPTION OF DRAWINGS

The present invention will be explained in more detail, by way of example, with reference to the drawings in which.

DESCRIPTION OF SPECIFIC EMBODIMENTS OF THE INVENTION

Figure 1:
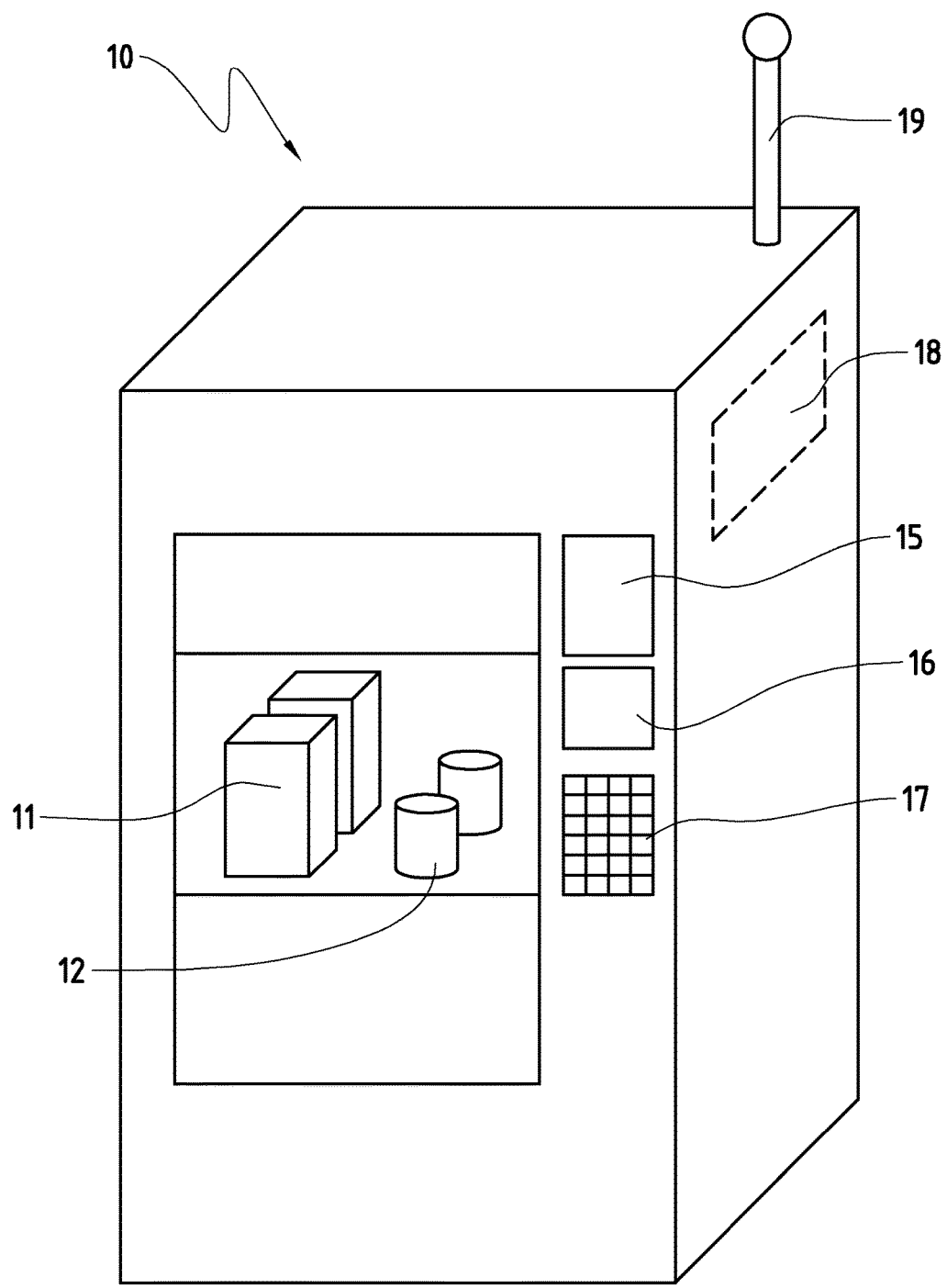
FIG. 1 is a schematic view of a point of sale according to one aspect of the present invention and which can particularly be used in connection with the method or the system for authorising access to goods and/or services according to another aspect of the present invention.

FIG. 1 illustrates in a schematic way one embodiment of a point of sale 10 according to one aspect of the present invention and which can particularly be used in connection with the method and the system for authorising access to goods and/or services according to the present invention.

The point of sale 10 is preferably an automated point of sale, such as a vending machine. At this point, we would like to emphasize that the present invention is not limited to this kind of point of sale, and it is possible to implement the embodiments of the invention at any other kind of point of sale if the corresponding requirements are similar or identical.

The point of sale 10 stores goods 11 and services 12. In FIG. 1, both goods 11 and services 12 have been represented using some very schematic forms, but a person skilled in the art will easily understand that both the goods 11 and services 12 can be of any other form or nature, and therefore the represented forms do not have to be interpreted in a limiting way. Of course, it is also possible to think of points of sale which do not directly store any goods or services but are exclusively used for authorising access to those goods and/or services (e.g. a turnstile used to control the access to a premise).

In FIG. 1, the point of sale 10 comprises a display means 15 and a data entry means (e.g. a keyboard) 17 which are used for interaction between a user and the point of sale 10. In particular, the display means 15 generally can display the purchase price of goods 11 and/or services 12 or indicate any other information to the user. The data entry means 17 can be used for selecting the goods 11 and/or services 12 but also for accessing any other information available. Of course, a person skilled in the art will easily understand that any other point of sale 10, including those without the described display means 15 and/or data entry means 17 or those with more sophisticated additional means, can be used without departing from the scope of the present invention.

When a user wishes to be authorised to access particular goods 11 and/or services 12 at the point of sale 10, he/she can generally use a classical authorisation method (e.g. he/she can use coins to pay the purchase price), but can also use the method according to the present invention.

Figure 2:
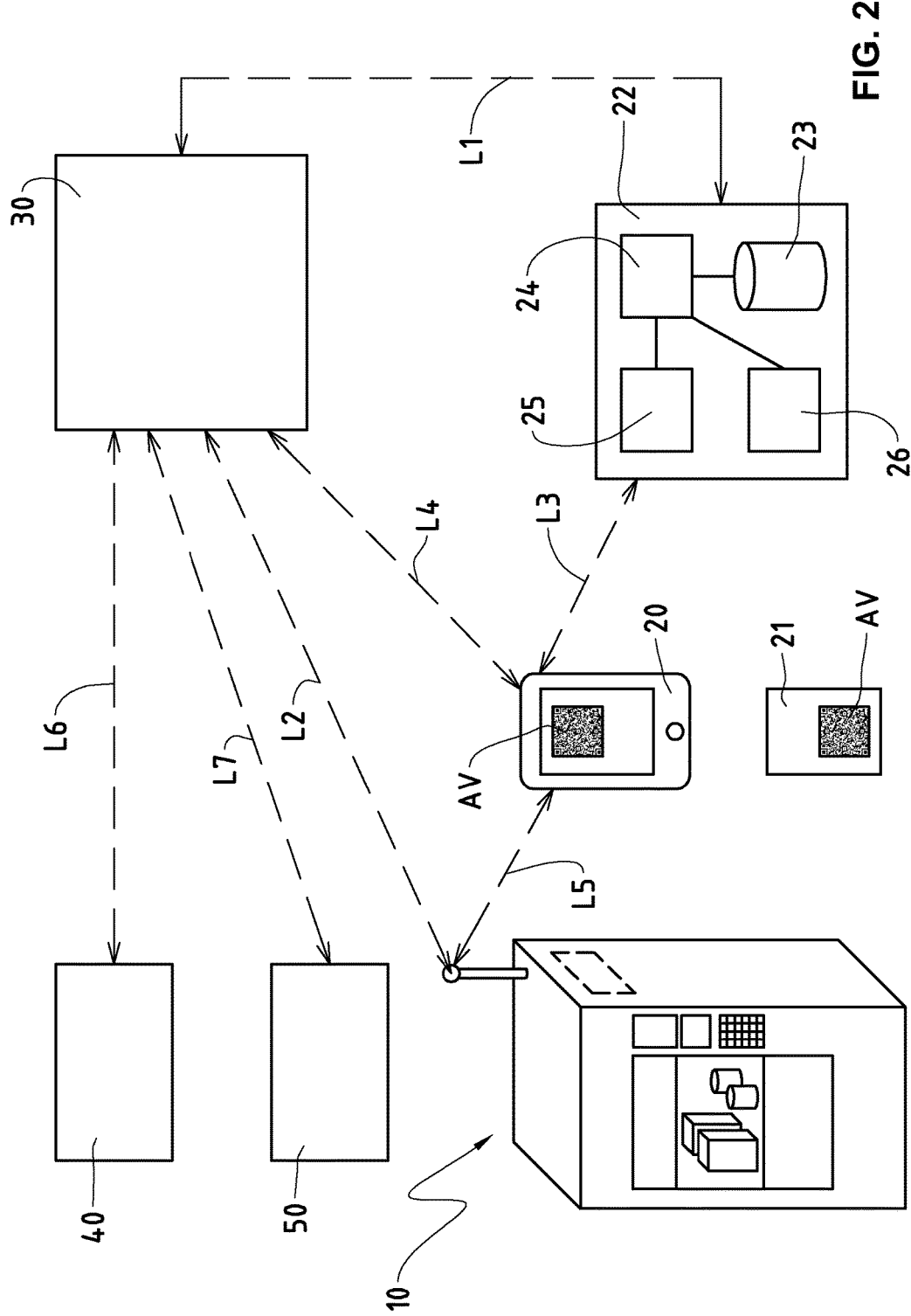
FIG. 2 is a schematic view of a system for authorising access to goods and/or services according to one embodiment variant of the present invention.

In particular, the point of sale 10 also comprises a reading means 16, which can be used to read the information of an access voucher AV (represented in FIG. 2). To this end, the access voucher AV can be physically presented to the reading means 16, which can read the data stored therein. Alternatively, the access voucher AV can also be stored on a device 20 (also represented in FIG. 2) in an electronic way such that the device 20 can transmit the access voucher AV (and/or the corresponding electronic data) to the reading means 16 of the point of sale 10 over an appropriate communication interface, without presenting the access voucher AV to the reading means 16 in a physical manner (the device 20 can for instance be an RFID chip or a smart-phone which can transmit the data of the access voucher AV to the reading means 16 using a wireless data connection such as Bluetooth or ZigBee).

In any case, the access vouchers AV which are used for authorising access to goods and/or services in the sense of the present invention comprise some machine-readable data which can be read by the reading means 16. The access vouchers AV can in particular comprise data which can be read optically, for example one-dimensional barcodes and/or two-dimensional matrix codes. To this end, the access vouchers AV can be placed on a physical support (e.g. paper 21 in FIG. 2) or be completely virtual (e.g. on a smart-phone 20 in FIG. 2). An optical code which is suitable for the present invention is a so-called QR code. QR codes consist of black modules, represented by square dots, arranged in a square pattern on a white background. The information encoded by a QR code can be made up of any kind of data, in particular alphanumeric data. Of course, any other kind of codes can also be used. On the other hand, the access voucher AV can also be implemented by any kind of non-optically readable data, such as data stored in a RFID tag or another similar device, as already mentioned above. However, the optical codes are preferred since they offer a bigger flexibility with lower costs.

The reading means 16, after the data of the access voucher AV has been read, can transmit this data to an internal processing unit 18 of the point of sale 10 (illustrated schematically in FIG. 1) for further processing.

The particularity of the system and the method according to the present invention reside in the fact that the data transmitted to the processing unit 18 of the point of sale 10 are not treated at the point of sale 10 but are transmitted to a centralised processing unit 30 of the system which is located remotely from the point of sale 10. FIG. 2 shows a schematic overview of the system according to an embodiment variant of the present invention.

In FIG. 2, the point of sale 10 as described above is represented on the left hand side together with two access vouchers AV, i.e. a first access voucher AV on a physical support 21 (e.g. a piece of paper) and a second access voucher AV on an electronic device 20 (e.g. a smart-phone). In addition to this, the system according to this embodiment variant of the present invention also comprises the centralised processing unit 30 and two control terminals 40 and 50 whose function will be described further down.

Generally, once the date of the access voucher AV have been read by the reading means 16 and transmitted to the processing unit 18 of the point of sale 10, this data is sent to the centralised processing unit 30 over a link L2. In general, the link L2 can be implemented in any known manner, for example using a wired or a wireless data transmission interface. To this end, the point of sale 10 comprises a corresponding interface represented schematically as an antenna 19 (cf. FIG. 1) on the top of the point of sale 10. Of course, this schematical representation does not imply that this communication interface is necessarily implemented in a wireless way and that the point of sale 10 needs to have a visible communication antenna.

Together with the data received from the access voucher AV, the internal processing unit 18 of the point of sale 10 also transmits the data relating to the goods and/or services of the point of sale 10 selected by the user. This data can be implemented as a simple identification number or code. Of course, any other way of implementing the data relating to the goods and/or services is possible. In other words, the internal processing unit 18 of the point of sale 10 performs only the action of gathering together the data received from the reading means 16 and coming from the access voucher AV and the data relating to the goods and/or services selected by the user and transmitting these data for further processing to the centralised processing unit 30.

The specificity of the present invention resides in the fact that a point of sale 10 does not have any detailed information about the goods and/or services 11, 12, for example prices. Instead, the point of sale 10 only stores an identification of each good 11 or service 12 which is then used for retrieving the corresponding information from the centralised processing unit 30.

FIG. 2 illustrates the structure of the centralised processing unit 30 in a simplified schematic way. The data which are sent from the internal processing unit 18 of the point of sale 10 are transmitted to the centralised processing unit 30 through the data link L2. These data can be of various natures and can also have various purposes and are prepared by a voucher issuing means 22 (described more in detail later on) at the time an access voucher AV is issued.

Generally, an access voucher AV will comprise at least an identification of the user. This identification can be an alphanumerical code but also another data that can be used to identify the user in an unambiguous way. Also, the access voucher AV can also comprise an identification of goods and/or services and/or an identification of a point of sale 10. Further, an access voucher AV can also comprise an identification of the access voucher AV itself and also a time identification. Of course, any other data can also be included in an access voucher AV. It is important to mention at this point that an access voucher AV can be issued only once for one particular user (e.g. it can correspond to a kind of general identification of the user) or issued many times for each user, in function of the goods and/or services requested. In the first case, a hard support for the access voucher AV (e.g. the smart-phone or a chip card) it is preferable while in the latter case, a non-permanent support (e.g. paper) is much more appropriate.

Figure 3:
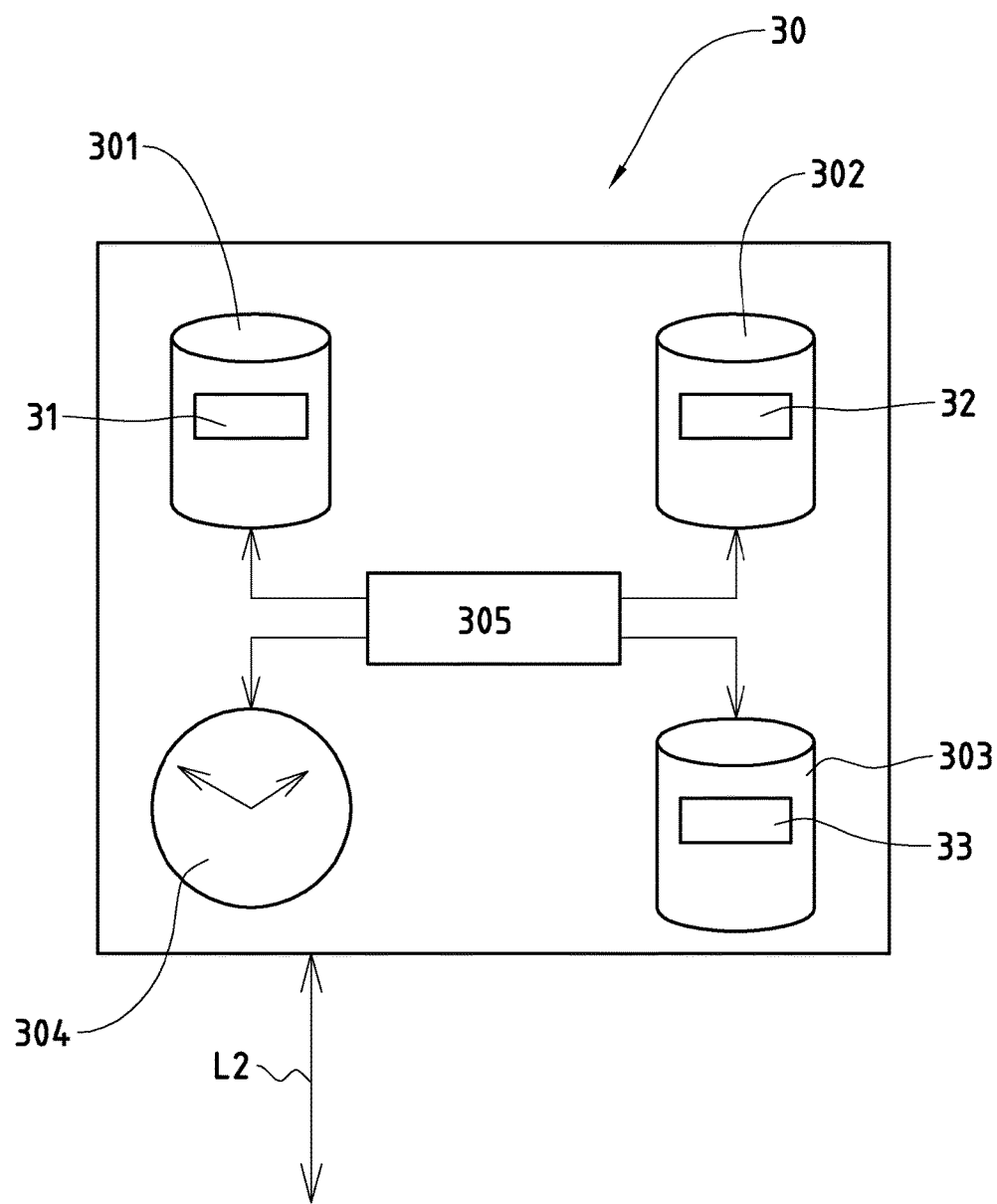
FIG. 3 is a schematic block view of the processing unit of the system according to one embodiment variant of the present invention.

As illustrated in FIG. 3, the centralised processing unit 30 can comprise various databases, namely the database 301 which stores at least one data set 31 relating to the identification of users and the database 302 which stores at least one data set 32 relating to the goods and/or services. A third database 303 which stores at least one data set 33 relating to the access points 10 can also be provided. Of course, all cited databases can be implemented in a single physical database device.

When the centralised processing unit 30 receives data from the internal processing unit 18 of the point of sale 10, the data received comprise in general an identification of the user (transferred to the point of sale 10 from the access voucher AV) and at least one identification of goods and/or services selected by the user. After receiving the data, the centralised processing unit 30 compares the transferred identification of the user with the data stored in the database 301 of the processing unit 30. In other words, the centralised processing unit 30 verifies whether the identification of the user which was received from the access voucher AV matches any of the data sets 31 which are stored in the database 301. If this is the case, the user is positively identified by the system.

In a next step, the centralised processing unit 30 compares the data relating to the goods and/or services received from the point of sale 10 with the data sets 32 relating to the goods and/or services stored in the database 302 trying to match these data. Once the corresponding data set 32 has been identified in the database 302, the information relating to the goods and/or services selected by the user (e.g. the price) is retrieved from the database. These data can either be stored in the same database 302 together with the various identifications of goods and/or services or in a separate database (not represented). Once these data have been retrieved, they can be sent back to the point of sale 10, e.g. in order to be displayed by the display means 15 of the point of sale 10.

In a next step, the centralised processing unit 30 verifies if the user (identified in the previous step) is authorised to access the goods and/or services requested. To this end, the centralised processing unit 30 compares e.g. the minimal age required for accessing the goods and/services (in case of tobacco products or alcohol) or the amount of money on the personal account of the user. The access to goods and/or services 11, 12 of the point of sale 10 is then authorised if the user identified in the previous step matches the predefined requirements for the access to the goods and/or services selected by him (or her). To this end, the centralised processing unit 30 sends the corresponding authorisation data over the link L2 to the point of sale 10 which releases the corresponding goods/and or services 11, 12. Since the point of sale 10 does not have any information about the goods and/or services 11, 12, the authorisation information sent from the centralised processing unit 30 is required in order to have the transaction completed. On the other hand, a non-authorised user, trying to get information about the goods and/or services 11, 12 from the point of sale 10 and/or to manipulate the point of sale 10 (e.g. by using false information) will not be able to gain access to the goods or/services 11, 12.

The centralised processing unit 30 can comprise a time module 304 which can be used for a further verification of the user and/or of the goods and/or services. For example, access to certain goods and/or services can be restricted during certain hours (e.g. alcohol cannot be sold in the night). Also, the data transferred to the centralised processing unit 30 from the point of sale 10 can be encrypted using any suitable encrypting means. In this case, the centralised processing unit 30 comprises a decryption means 305 for decrypting this encrypted data before they can be compared with data which are stored data in the databases 301, 302, 3030.

The access voucher issuing means 22 are also schematically represented in FIG. 2. Basically, the access voucher issuing means 22 can comprise a processing unit 24 which can prepare the access voucher AV based on the predetermined information. Depending on the kind of access voucher AV, the access voucher AV is either printed on a physical support 21 by the printer 26 or generated in an electronic way and transmitted to a device 20 by means of the module 25 over the appropriate link L3. A database 23 can be used in the process of issuing the access vouchers AV. Once the access voucher AV has been issued, the corresponding information with all relevant data is transmitted to the centralised processing unit 30 via the link L1. Of course, it would also be possible to imagine a solution in which the issuance of access vouchers AV is performed by the centralised processing unit 30 and that all necessary data is simply transmitted to the decentralised access voucher issuance means 22 over the link L1.

Furthermore, the system according to an embodiment variant of the present invention can comprise a control terminal 40 which can be connected to the centralised processing unit 30 by means of a data link L6 and a control terminal 50 which can be connected to the centralised processing unit 30 by means of a data link L7.

The control terminal 40 can be used by a user of the system in order to connect to the centralised processing unit 30 and, for example, verify the current status of his or her credit account. Also, the user can use the terminal 40 in order to modify the profile data and/or to charge or discharge his or her credit account. To this end, any known method can be used. Also, the control terminal 40 can be either a software-implemented object accessible through a web browser of a similar program, a dedicated application (including an app for a smart-phone, tablet computer or similar) or even a dedicated hardware terminal (e.g. in a form of a cash dispenser or similar).

On the other hand, the control terminal 50 can be used by an administrator of the system and/or by the proprietor of the point of sale 10 in order to connect to the centralised processing unit 30 and, for example, verify the current stock of the goods and/or services at the point of sale 10 or administer the point of sale 10 (e.g. by changing the prices of goods and/or services 11, 12). As with the control terminal 40, the control terminal 50 can also be a software-implemented object accessible through a web browser of a similar program, a dedicated application (including an app for a smart-phone, tablet computer or similar) or even a dedicated hardware terminal.

As already mentioned above, the advantage of the present method over all prior art solutions is the fact that the point of sale 10 can be kept very simple and therefore less costly than comparable points of sale 10. In particular, the whole processing of the request for access to goods and/or services 11, 12 and administering of the point of sale 10 can be outsourced to the centralised processing unit 30 which allows for a simple and secure implementation of the point of sale 10.

Although the disclosure of the present invention has been described with reference to particular means, materials and embodiments, one skilled in the art can easily ascertain from the foregoing description the essential characteristics of the present disclosure, while various changes and modifications may be made to adapt the various uses and characteristics as set forth in the following claims.

The invention claimed is:

1. A method for authorizing access to goods and/or services at a point of sale, in which access to goods and/or services is authorized based on an identification of the user, comprising:
   issuing an access voucher by a voucher issuing means, the access voucher comprising at least an identification of the user,
   receiving an indication of the access voucher by to a reading means of the point of sale, at least the identification of the user,
   transferring the indication of the access voucher, by the reading means, to an internal processing unit of the point of sale,
   receiving an indication of a selection of at least one good and/or service of the point of sale, the indication of the selection comprising at least an identification of the at least one good and/or service of the point of sale,
   transferring the indication of the selection to the internal processing unit,
   transferring, by the internal processing unit, the identification of the user and the identification of the at least one good and/or service to a centralised processing unit which compares the transferred identification of the user with at least one stored identification of the user and the identification of the at least one good and/or service with at least one stored identification of goods and/or services, wherein if the transferred identification of the user matches an identification of the user stored in the centralised processing unit and if the transferred identification of the goods and/services matches an identification of the goods/and services stored in the centralised processing unit, the centralised processing unit retrieves user profile data and the access parameter for the goods and/or services, and receiving, by the point of sale from the centralised processing unit, an authorization for accessing the at least one goods and/or services if the user profile data correspond to the access parameter for the goods and/or services.

2. The method according to claim 1, wherein the access voucher comprises optical machine-readable data, in particular a barcode and/or a matrix code.

3. The method according to claim 1, wherein the machine-readable data of the access voucher are arranged on a disposable support, in particular on paper.

4. The method according to claim 1, wherein the data between the point of sale and the centralised processing unit are transmitted over a wired and/or wireless link, in particular over a data communication protocol.

5. The method according to claim 1, wherein the user profile data comprises the information about the current state of the personal credit account.

6. The method according to claim 1, wherein the access parameters for the goods and/or services comprise the purchase price of the goods and/or services.

7. The method according to claim 1, wherein the identification of the user and/or the identification of the goods and/or services transmitted to the centralised processing unit are encrypted, and that the centralised processing unit comprises a decryption means for decrypting encrypted data.

8. A system for authorizing access to goods and/or services at a point of sale, in which access to goods and/or services is authorized based on an identification of a user, comprising:

an access voucher issuing means for issuing access vouchers comprising at least an identification of the user, a reading means of the point of sale for reading and transferring at least the identification of the user to an internal processing unit of the point of sale when the access voucher is presented to the reading means, a means for selecting at least one good and/or service of the point of sale by the user and transferring the corresponding identification of the selected goods and/or services to the internal processing unit, a centralised processing unit comprising a database with at least one stored identification of the user and a database with at least one stored identification of goods and/or services, the centralised processing unit comprising means for comparing the transferred identification of the user with the at least one stored identification of the user and the transferred identification of the goods and/or services with the at least one stored identification of goods and/or services, wherein, if the transferred identification of the user matches an identification of the user stored in the centralised processing unit and if the transferred identification of the goods and/services matches an identification of the goods/and services stored in the centralised processing unit, user profile data and the access parameter for the goods and/or services are retrieved, and that the centralised processing unit comprises means for transferring an authorization for accessing the selected goods and/or services to the point of sale if the user profile data correspond to the access parameter for the goods and/or services.

9. The system according to claim 8, wherein the access voucher comprises optical machine-readable data, in particular a barcode and/or a matrix code.

10. The system according to claim 8, wherein the machine-readable data of the access voucher are arranged on a disposable support, in particular on paper.

11. The system according to claim 8, wherein the data between the point of sale and the centralised processing unit are transmitted over a wired and/or wireless link, in particular over a data communication protocol.

12. The system according to claim 8, wherein the user profile data comprises the information about the current state of the personal credit account.

13. The system according to claim 8, wherein the access parameters for the goods and/or services comprise the purchase price of the goods and/or services.

14. The system according to claim 8, wherein the centralised processing unit comprises a decryption means for decrypting encrypted data.

15. A point of sale of goods and/or services in which access to goods and/or services is authorized based on an identification of a user, comprising a reading means for reading and transferring at least the identification of the user to an internal processing unit when the access voucher is presented to the reading means, a means for selecting at least one good and/or service by the user and transferring the corresponding identification of the selected goods and/or services to the internal processing unit, a means for transferring identification of the user and the identification of the goods and/or services to a centralised processing unit, and means for receiving an authorization for accessing the selected goods and/or services from the centralised processing unit and for releasing the goods and/or services selected by the user.

* * * * *